Dec. 15, 1964  J. W. SANDERS ETAL  3,161,858
ELECTRICAL STORAGE CIRCUIT
Filed Nov. 8, 1960
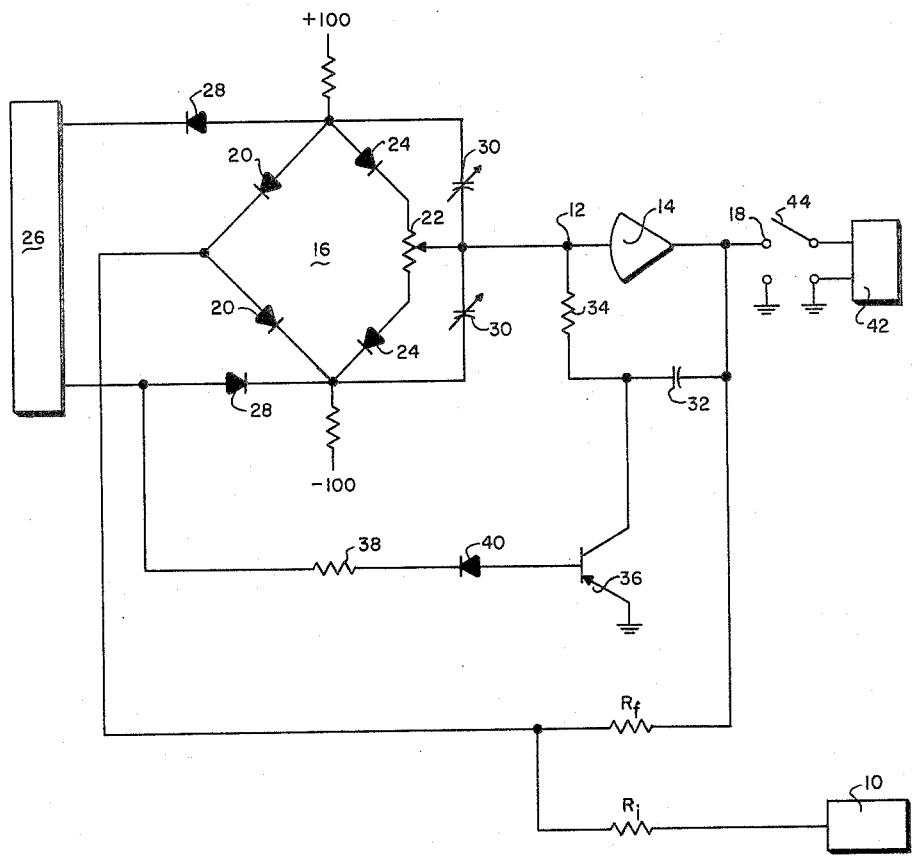
INVENTORS
JAMES W. SANDERS
JAMES R. PATMORE
BY
E. A. Pethe
THEIR ATTORNEY United States Patent Office 3,161,858
Patented Dec. 15, 1964

3,161,858
ELECTRICAL STORAGE CIRCUIT
James W. Sanders and James R. Patmore, Neptune, N.J., assignors to Electronic Associates Inc., Long Branch, N.J., a corporation of New Jersey
Filed Nov. 8, 1960, Ser. No. 67,997
7 Claims. (Cl. 340—173)

This invention relates generally to electrical storage circuits, and, more particularly, to a circuit arrangement for sampling and storing an electrical signal so that it may be available at some later time.

In many applications in the electronic art, it is often necessary to store, for a period of time, an electrical signal in the form of a potential or current which will be used at a later time. An example of such an application is the iterative solution of differential difference equations where the same basic equation is solved a number of times, the solution for each step or computation being an initial condition for a subsequent step or computation. Prior art storage devices for accomplishing such operation have generally lacked precision and have been unable to maintain the information stored for a long period of time. Yet other storage devices cause substantial delays in the iterative solution of these problems because of their inability to instantaneously sample and store the available information.

It is, therefore, an object of this invention to accurately sample and store an electrical signal.

It is another object of the present invention to provide a device for storing electrical signals of the analog variety which is substantially instantaneous in operation.

Another object of the present invention is to provide a device which will store precise electrical signals for substantial periods of time.

Yet another object of the present invention is to substantially instantaneously store electrical signals on a capacitor and to accurately maintain the stored signals for a substantial period of time.

Briefly stated, the present invention utilizes an operational amplifier, including an input network and a feedback network, for impressing a charge on a capacitor which accurately represents an input signal. A first switching means is provided at the input terminals of the amplifier for connecting a source of input signals to the input network of the amplifier. A second switch means is actuated between positions in response to the condition of the first switch means for initially connecting the capacitor across the output terminals of the amplifier in order to receive a charge which corresponds to the output signal from the amplifier. After the capacitor is fully charged, the first and second switch means may be actuated to another position wherein the input and feedback networks are disconnected from the amplifier and the capacitor is connected in such a manner as to provide a feedback circuit between the input and output terminals of the amplifier. Thus, the capacitor is initially charged very quickly to a condition which is equal to a signal which it is desired to store and this charge is thereafter maintained by the amplifier. Means may be provided for connecting the capacitor to a load when it is desired to use the information which has been stored.

These and other objects, features and advantages will become apparent from the following description taken in connection with the accompanying drawing, the single figure of which illustrates a preferred embodiment of the present invention.

Referring now to the drawing, there is shown at 10 a source of input signal which may be in the form of an operational amplifier which develops an analog voltage or current which it is desired to sample and store. The source 10 is connected to the input terminal 12 of an amplifier 14 via an input resistor $R_i$ and a suitable switch means, such as the diode gate circuit indicated generally at 16. A feedback resistor $R_f$ is connected between the amplifier output terminal 18 and the input terminal 12 via the switch means 16.

The common juncture of resistors $R_i$ and $R_f$ is shown to be connected to the input terminal of the gate circuit 16 intermediate a pair of diode elements 20. The output signal from the gate circuit 16 is applied directly to the input terminal 12 from the wiper contact of a potentiometer 22. Potentiometer 22 is connected in a series of circuit arrangement with a pair of similar diode elements 24 and provides means for balancing the D.C. resistance of the gate circuit diodes 20, 24. The upper juncture of diode elements 20, 24 is connected to a suitable source of biasing potential, indicated as +100V, via a suitably proportioned resistor; the lower juncture of diode elements 20, 24 is similarly connected to a suitable source of biasing potential, indicated as −100V, via a similar suitably proportioned resistor. The upper and lower junctures of diode elements 20, 24 are also each connected to a source of switching potential 26 via a similar diode element 28. To complete the switch means 16 of the present invention, a capacitor 30 is shown to be connected from each juncture of diode elements 20, 24 to the wiper contact of the potentiometer 22. Capacitors 30 are preferably adjustable in form and are utilized for purposes of balancing the distributed capacitance of the diodes 20 and 24.

The source of switching potential 26 preferably provides equal amplitudes of positive and negative potential for application to the diode elements 28 for the purpose of biasing the diodes 20, 24 between conditions of conduction and nonconduction. It is to be noted that the diodes 28 are oppositely poled with respect to the source 26. In the case where a positive potential is applied to the upper diode 28 while a negative potential is being applied to the lower diode 28, both diodes 28 are back or reverse biased and the gate 16 is "on" or in a condition to conduct input signals from the source 10 to the input terminal 12. When the polarity of potential applied to diodes 28 is reversed, the diodes 28 will conduct and the gate circuit 16 is "off" or in a condition to prevent the conduction of input signals to the input terminal 12.

Amplifier 14 preferably has a high gain, wide band characteristic and may be stabilized by suitable means such as the well known chopper stabilization circuit, the details of which are not essential to an understanding of the present invention. With the gate circuit 16 biased to a condition to conduct, the resistors $R_i$ and $R_f$ are connected to the amplifier 14. The amplifier is thus operated degeneratively to maintain its input terminal 12 substantially at ground potential and to produce an output signal at the terminal 18 which is linearly related to the input signal from the source 10 by the ratio $R_f/R_i$. Being operated degeneratively, the polarity of the amplifier output is normally opposite to that of the amplifier input.

A charge which is proportional to the magnitude of output signal appearing at the terminal 18 will be stored on a capacitor 32. To this end, the capacitor 32 is shown to have one plate connected to the output terminal 18 and to have another plate connected to the input terminal 12 via a suitable resistor 34. The juncture of resistor 34 and capacitor 32 is adapted to be connected to ground potential by a suitable switch means, such as the PNP transistor 36. In the figure, the transistor 36 is shown to have its emitter electrode connected directly to ground potential, to have its collector electrode connected to the juncture of resistor 34 and capacitor 32, and to have its base electrode connected to the input circuit of one of the diode elements 28. A switching circuit including a serially connected resistor 38 and diode element 40 comprises the connection between the base of transistor 36 and the input circuit to the diode 28. The circuit of the present invention is completed by an operative connection between a suitable load device 42 and the output terminal 18 through a suitable switching element 44.

In the condition where gate circuit 16 is "on," as previously described, an output signal which is linearly related to the signal from source 10 will appear at the output terminal 18. A negative potential is being applied from the switching source 26 to the lower diode element 28 in this condition of the gate circuit. Due to the arrangement of the diode element 40 in the transistor switching circuit, this negative switching potential is also applied to the base of transistor 36. Accordingly, transistor 36 is biased to a condition of conduction. When transistor 36 conducts, the common juncture of resistor 34 and capacitor 32 is connected to ground potential and capacitor 32 is charged to a value which is equal to the amplitude of the signal then appearing at output terminal 18. Capacitor 32 will become fully charged very quickly. If the amplifier 14 and the transistor 36 are near perfect components, the accuracy with which the capacitor charge represents the output signal from the amplifier and rapidity with which the capacitor becomes fully charged is determined only by the inherent characteristics of the capacitor itself.

The fact that the input terminal 12 of amplifier 14 is connected to ground potential via the resistor 34 while the capacitor 32 is being charged does not interfere with the accuracy or operation of the present circuit. No current flows from input terminal 12 through the resistor 34 because both ends of the resistor are maintained at ground potential. Therefore, the value of resistor 34 is not critical. However, the larger its value, the less significant is its impedance loading of the input terminal 12.

At the conclusion of a sampling operation the polarity of the switching potential being applied to diodes 28 is reversed to render the gate circuit 16 nonconducting. When gate circuit 16 is biased to a condition of nonconduction, the diode element 40 becomes back or reverse biased to remove the negative signal from the base of transistor 36. The resistors $R_i$ and $R_f$ are disconnected from the input terminal 12 by the gate circuit 16 and the resistor 34 and capacitor 32 are disconnected from ground potential by the transistor 36. When this occurs, amplifier 14 has remaining connected to it only the series circuit arrangement of the resistor 34 and the capacitor 32. With this arrangement, no input signal is applied to the amplifier 14 and the output signal appearing at terminal 18 is exactly equal to the charge then appearing on the capacitor 32. If amplifier 14 is a near perfect amplifier, viz., a low impedance, the charge on the capacitor will be accurately maintained because the amplifier will not significantly load or otherwise discharge the capacitor.

When it is desired to use the signal stored on the capacitor, the switch 44 is actuated to a closed position in order to connect the load 42 to the output terminal 18. The amplifier 14 represents a low impedance source and when the switch 44 is closed the load 42 does not significantly vary the charge on the capacitor. Instead, substantial current may be drawn from the amplifier 14 at a voltage level which corresponds in amplitude to the charge on the capacitor 32. Accordingly, the output signal from the amplifier provides an accurate representation of the signal which has ben stored without destroying or modifying the stored signal.

When a new signal from the source 10 is to be stored, the gate circuit 16 is once again switched to its "on" condition by a reversal of the polarity of the potentials at the source 26. The input and feedback resistors $R_i$ and $R_f$ are again connected to the amplifier and the capacitor 32 once again is connected to ground potential by the transistor 36. The new output signal which will appear at output terminal 18 will charge the capacitor 32. This charge will thereafter be maintained by the amplifier 14 when the polarity of the switching potential is reversed at the source 26. As should be apparent to those skilled in the art, the resistor 34 can be entirely eliminated from the embodiments shown and replaced by a suitable normally open switch means which operates in tandem with the transistor 36 for connecting the capacitor 32 to the input terminal 12 after it has been fully charged and disconnected from ground potential.

While only one embodiment of the present invention has been shown and described herein, and inasmuch as this invention is subject to many variations, modifications and reversals of parts, it is intended that all matter contained herein shall be interpreted as illustrative and not in a limiting sense.

We claim:

1. An electrical storage circuit comprising a high gain negative feedback amplifier including an input network and a feedback network having a common junction for producing an output signal substantially equal to and corresponding to the amplitude of an input signal, a capacitor connected to the output terminal of said amplifier and being charged by the output signal therefrom, and switch means connected to said amplifier and to said capacitor for disconnecting said common junction of said input and feedback networks from said amplifier while connecting said capacitor between the input and output terminals thereof.

2. The electrical storage circuit of claim 1 in which said switch means includes means for connecting a side of said capacitor remote from said output terminal to a point of fixed potential for said charging of said capacitor by said output signals and for disconnecting said side of capacitor from said point of fixed potential upon said disconnecting of said common junction from said amplifier.

3. The electrical storage circuit of claim 1 in which there is provided resistance means connected between said capacitor and said input terminal of said amplifier and in which said switch means includes means for connecting the common junction of said resistance means and said capacitor to a point of fixed potential for said charging of said capacitor by said output signal and for disconnecting said last-named common junction from asid point of fixed potential upon said disconnecting of said common junction of said input and feedback networks from said amplifier.

4. An electrical storage circuit comprising a high gain amplifier including an input terminal and an output terminal, an input impedance element having a common junction and a feedback impedance element adapted to be connected to said amplifier, whereby said amplifier produces an output signal which is related to an input signal by ratio of said input and feedback elements, a capacitor adapted to be connected to said output terminal and charged by an output signal from said amplifier, and switch means actuated to a first position for connecting said common junction of said input element and said feedback element to said amplifier so that said capacitor will be charged, and actuated to a second position to disconnect said common junction of said input element and said feedback element from said amplifier and to connect said capacitor between said input terminal and said output terminal.

5. The electrical storage circuit of claim 2 in which there is provided resistance means connected between said capacitor and said input terminal and in which said switch means includes means for connecting the common junction of said capacitor and said resistance means to a point of constant potential so that said capacitor will be charged when said switch means is actuated to said first position and for disconnecting said last-named common junction from said point of constant potential when said switch means is actuated to said second position.

6. An electrical storage circuit comprising a high gain negative feedback amplifier including an input impedance element and a feedback impedance element for producing an output signal which is related to an input signal by the ratio of said input and feedback elements, a series circuit arrangement of a resistor element and a capacitor element connected between the input terminal and the output terminal of said amplifier, and switch means having one position for connecting the juncture of said resistor element and said capacitor to a point of fixed potential in order for said capacitor to be charged by the output signal from said amplifier, and having another position for disconnecting said impedance elements from said amplifier and for disconnecting said juncture from said point of fixed potential.

7. An electrical storage circuit comprising a high gain negative feedback amplifier including an input terminal and an output terminal, a series circuit arrangement of an input impedance element and a feedback impedance element, the free end of said input element being adapted to be connected to a source of input signal and the free end of said feedback element being connected to said output terminal, a series circuit arrangement of a resistor element and a capacitor element connected between said input terminal and said output terminal, and switch means having one position for connecting the common juncture of said resistor element and said capacitor element to a point of fixed potential whereby said capacitor is charged by the output signal from said amplifier while connecting a common juncture of said impedance elements to said input terminal, and having a second position for disconnecting said common juncture of said impedance elements from said input terminal while disconnecting the common juncture of said resistor element and said capacitor element from the point of fixed potential.

References Cited in the file of this patent

UNITED STATES PATENTS

| | | |
|---|---|---|
| 2,691,728 | Noble et al. | Oct. 12, 1954 |
| 2,843,736 | Huntley | July 15, 1958 |
| 2,914,750 | Cook | Nov. 24, 1959 |
| 3,050,673 | Widmer | Aug. 21, 1962 |

OTHER REFERENCES

Publication: Basics of Analogue Computers, Truitt and Rogers (QA76.4T7), pp 3–30 through 3–32.